Figure 1:
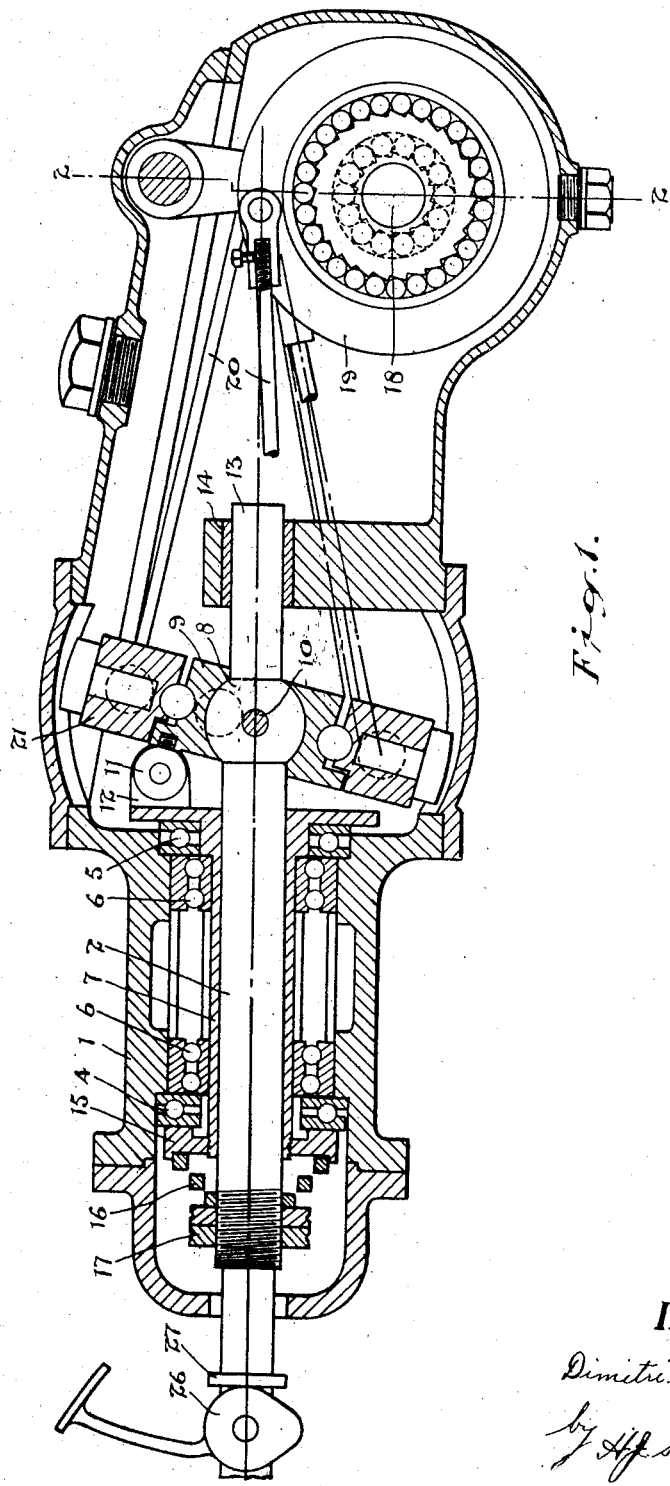

May 5, 1925.  1,536,819

D. S. DE LAVAUD

AUTOMATIC VARIABLE POWER TRANSMISSION

Filed Jan. 28, 1922   2 Sheets-Sheet 1

Inventor.
Dimitri Sensaud de Lavaud.
by Aff. S. Dennison
Atty.

May 5, 1925. 1,536,819
D. S. DE LAVAUD
AUTOMATIC VARIABLE POWER TRANSMISSION
Filed Jan. 28, 1922   2 Sheets-Sheet 2
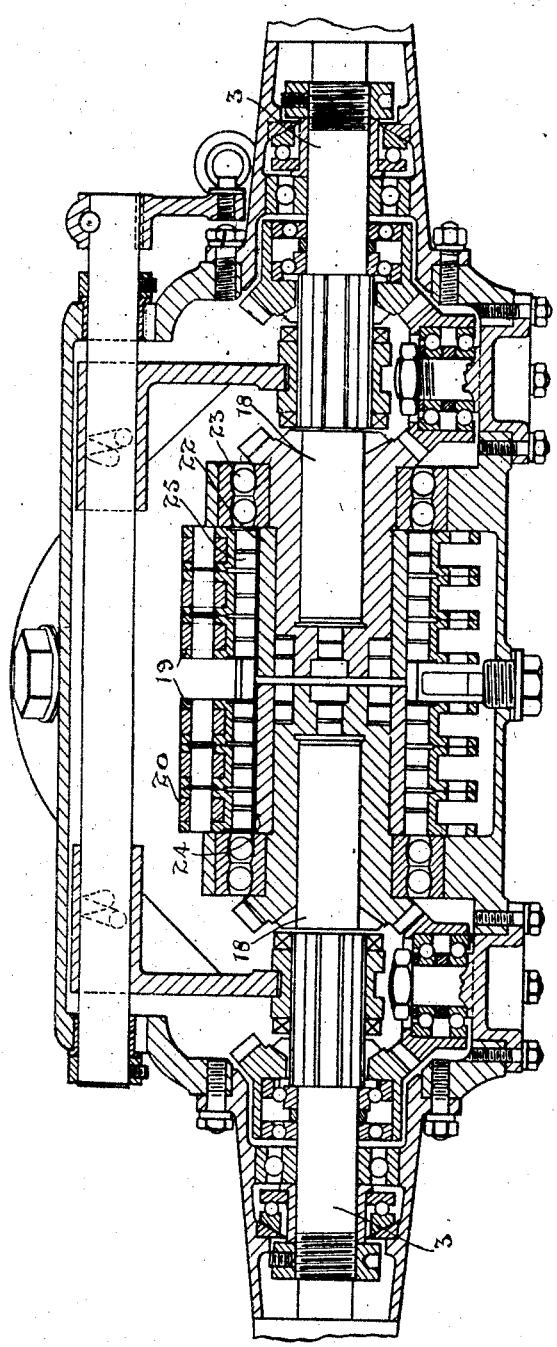
Inventor.
Dimitri Sensaud de Lavaud
by H. J. S. Dennison
atty.

Patented May 5, 1925.

1,536,819

UNITED STATES PATENT OFFICE.

DIMITRI SENSAUD DE LAVAUD, OF PARIS, FRANCE.

AUTOMATIC VARIABLE POWER TRANSMISSION.

Application filed January 28, 1922. Serial No. 532,463.

*To all whom it may concern:*

Be it known that I, DIMITRI SENSAUD DE LAVAUD, a citizen of the United States of Brazil, and resident of the city of Paris, in the Republic of France, have invented certain new and useful Improvements in Automatic Variable Power Transmission, described in the following specification and illustrated in the accompanying drawings that form part of the same.

The principal objects of this invention are to improve the general construction of the invention disclosed in my companion application No. 532,462, filed January 28th 1922, and particularly to provide a transmission device in which the speed of the driven member will vary automatically in direct proportion to the torque, thereby eliminating the necessity of providing a manually controlled device for regulating the ratio between the driving and driven members.

The principal feature of the invention consists in interposing a balancing medium to automatically effect a change in the angularity of the axis of the oscillating member in direct proportion to the torque of the driven member, thereby automatically adjusting the throw of the members for operating the driven member and changing the gear ratio.

A further important feature consists in the novel construction of the oscillating member and of the bearing supports for the driving shaft.

A still further important feature consists in the novel arrangement of mechanism for allowing a differential action in a divided driven member.

In the drawings Figure 1 is a longitudinal vertical mid-section of my improved transmission.

Figure 2 is a vertical mid-sectional view through the line 2—2 of Figure 1.

The construction shown is applied to a motor car drive and the casing 1 encloses the propeller shaft 2 and rear axle 3 forming an oil tight chamber. Within the forward end of the casing are arranged the thrust bearings 4 and 5 and the bearings 6 which support the sleeve 7 in which the shaft 2 is slidably mounted.

The shaft 2 is formed with a spherical enlargement 8 upon which is mounted a concentric sheave 9 which oscillates on the trunnion pin 10. The sheave is provided with a lug 11 which is pivotally secured in a jaw 12 on the adjacent end of the sleeve 7 and thus connects the shaft, sheave and sleeve to rotate together. The rear end 13 of the shaft is supported in a bearing 14 in which it is free to slide.

A ring 15 is secured to the forward end of the sleeve and bears on the thrust bearing 4, thus holding the sleeve from longitudinal movement.

A helical compression spring 16 encircles the shaft 2 and bears against the ring 15 and adjusting nuts 17 on the shaft engage the apex of the spring and the shaft is thus normally held in the forward position with the axis of the sheave 9 at its greatest angularity.

The driven shaft 18 is rotated through a ratchet device, the operating rings 19 of which are connected by the rods 20 to a ring 21 mounted on anti-friction bearings on the sheave 9.

As the driving shaft rotates, the sheave 9 by reason of the angularity of its axis, oscillates and imparts a reciprocating motion to the rods 20 which in turn rotate the driven shaft through the ratchet mechanism and the speed of rotation of the driven member will vary according as the axis of the sheave varies in its angular relation to the shaft.

When there is no load on the driven shaft, the spring 16 holds the shaft 2 in the forward position as shown but when load is applied to the driven shaft the resistance to rotation opposes the pull of the rods 20 and tends to shift the angularity of the axis of rotation of the sheave and the pull is transmitted to the shaft 2 through the trunnion supports of the sheave. This movement is opposed by the spring 16 and its resistance increases in direct proportion to the increase of the torque of the driven shaft. As the torque increases the angularity of the axis of rotation of the sheave is shifted closer into line with the axis of the driving shaft and the oscillations of the sheave are of lesser length, consequently the throw of the rods 20 is lessened and the speed is reduced. An automatic change of the ratio between the driving and driven shafts is thus effected and it will be readily seen that this ratio has a full range from full speed to zero. The consequence of this is that the ratio will automatically adjust according to the power and the load and there will be no waste. The result of such achivement will be a direct economy of power with a consequent saving of fuel.

Further, the changing of gears is eliminated and the very undesirable condition of disconnecting the driven shaft from the driving power is obviated and a practically perfect condition of control is achieved. That is to say, in the operation of motor cars, the engine may be throttled down to any speed as required in congested traffic and when acceleration is required there will be no change of gears necessary. The acceleration of the engine is merely increased until the required power to overcome the inertia of the load is transmitted and the desired speed of the car is attained. This dispenses entirely with racing the engine and the attendant evils.

In the adaptation of this invention to the driving mechanism for a motor car, it is necessary to provide for the inequalities in the conditions of travel, that is to say, there must be a differential action between the driving wheels and one must be free to move independent of the other.

In the drawings herewith the axle or driven shaft 18 is divided centrally and encircling the end of each member is a sleeve 22 which is supported in suitable bearings 23 within the casing 1. Each of the sleeves 22 is provided with a ratchet surface 24 to which rotation is communicated by the rollers 25 which are in turn driven by the ratchet mechanism directly connected with the rods 20.

The arrangement of this secondary ratchet provides a communication between the driving mechanism and the axle which will permit either wheel to turn in a forward direction free of the other, consequently as the motor car travels one wheel may travel freely in advance of the other, thus allowing a perfect differential action.

It will be noted that in such differential action the power is applied by the slower moving or inside wheel.

In the operation of a motor car equipped with a transmission such as described, it may be desirable to have available means for manually controlling the power ratio and such a means is illustrated in the form of a pedal cam 26 suitably mounted and adapted to engage a collar 27 on the driving shaft. Pressure upon the pedal will rotate the cam to effect the compression of the balancing spring which will have the effect of shifting the axis of rotation of the oscillating member thus creating a variation in the power ratio between the driving and driven members.

What I claim as my invention is:—

1. In a variable power transmission, a driven shaft, a longitudinally movable driving shaft, an oscillating member rotatable with the driving shaft and operatively connected with the driven shaft, and a spring medium exerting a longitudinal pressure on the driving shaft in opposition to the torque of the driven shaft.

2. In a variable power transmission, a driven member, an oscillating member operatively connected with the driven member, a longitudinally movable driving shaft, an oscillating member rotatable with the driving shaft and pivoted on an axis transverse thereof, a member adapted to rotate in a fixed plane and pivotally connected to the rotatable oscillating member, and a balancing medium exerting a longitudinal force against said driving shaft tending to hold the axis of said rotating oscillating member in angular relation to the axis of rotation of the driving shaft.

3. In a variable power transmission, a driven member, a non-rotatable oscillating member operatively connected with the driven member, a longitudinally movable driving shaft, a member rotatably connected with the driving shaft and adapted to oscillate thereon, a member rotatable with the driving shaft and held from axial movement and pivotally connected at one side of the axis of the rotatable oscillating member carried by the driving shaft, and a balancing member exerting a longitudinal pressure upon the driving shaft to hold the oscillating member with its axis of rotation in angular relation to the axis of the driving shaft in opposition to the torque of the driven member.

4. In a variable power transmission, a driven member, an oscillating member operatively connected with the driven member, a longitudinally movable driving shaft, a member rotatably connected with the driving shaft and adapted to oscillate thereon, a member rotatable with the driving shaft and held from axial movement and pivotally connected at one side of the axis of the rotatable oscillating member carried by the driving shaft, and a spiral compression spring encircling the driving shaft and exerting a longitudinal pressure thereon to hold the oscillating members with their respective axes of rotation in angularity with the driving member and effecting an automatic balance between the driving power and the torque of the driven member.

5. In a variable power transmission, a casing, a sleeve member rotatably mounted in said casing and held from longitudinal movement, a driving shaft slidably arranged in said sleeve, a spiral compression spring encircling said driving shaft at one end of the sleeve, and adjustable contact on the driving shaft engaging said spring, an oscillating member pivoted on the end of the driving shaft opposite to the spring, a projection carried by the rotatable sleeve, a member rigid with the oscillating member pivotally connected with the projection from said sleeve, a ring rotatably mounted on said oscillating member and non-rotatively held to oscillate therewith, and means connecting said ring with the driven member to impart rotative action thereto through its oscillations.

DIMITRI SENSAUD DE LAVAUD.